Patented June 2, 1953

2,640,830

UNITED STATES PATENT OFFICE 2,640,830

5-HYDROXY-4:7-PHENANTHROLINES AND THE PREPARATION THEREOF

Jean Druey, Riehen, and Paul Schmidt, Therwil, Switzerland, assignors to Ciba Pharmaceutical Products, Inc., Summit, N. J.

No Drawing. Application April 17, 1950, Serial No. 156,492. In Switzerland April 29, 1949

3 Claims. (Cl. 260—288)

The present invention relates to new 4:7-phenanthrolines and to the preparation thereof. More particularly, the invention is concerned with 5-hydroxy-4:7-phenanthroline and with the ethers, such as the alkyl, for example, the methyl and ethyl ethers, and aryl ethers thereof and also with the salts of these phenanthrolines. The following ring structure:

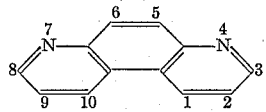

is characteristic of these compounds.

These compounds have valuable pharmacological properties. They exert a pronounced action on the central nervous system, their respiratory stimulating action predominating. The action of many of the said compounds is similar to that of strychnine, but the toxicity of the new compounds is much smaller. The 5-hydroxy-4:7-phenanthroline and 5-methoxy-4:7-phenanthroline are particularly valuable. The new compounds are thus useful as therapeutic agents.

The new 4:7-phenanthrolines can be prepared according to the present invention, by subjecting 1:4-phenylene-diamines, or compounds which are equivalent so far as the Skraup synthesis is concerned, which contain a free or an etherified hydroxyl group as sole substituent, to a duplicated Skraup synthesis, the two stages of which are carried out either simultaneously or one after the other. Compounds which are equivalent so far as the Skraup synthesis is concerned are for example corresponding 4-nitranilines, mono- or diacyl-1:4-phenylene-diamines or 4-aminoazobenzenes containing the said free or etherified hydroxyl group.

In accordance with this process, the specified starting materials are reacted with glycerol or with acrolein which is produced therefrom. The reaction is carried out in the presence of a condensing agent, as for example, sulphuric acid, and an oxidizing agent, such as arsenic acid. A nitraniline employed as starting material may also have an oxidizing effect in this reaction. In the simultaneous double Skraup synthesis, the desired phenanthroline is obtained in one reaction stage. On the other hand when the process is carried out in stages, the corresponding amino-quinoline is first produced and the phenanthroline only subsequently formed.

The new compounds can also be prepared by a process which comprises starting from a 4:7-phenanthroline which contains in 5-position a halogen atom or a sulpho or amino group, and carrying out the step of replacing the said atom or group by a free or etherified hydroxyl group. Thus, a halogen phenanthroline may be reacted with an alcohol or phenol in the presence of an acid-binding agent or with a corresponding alcoholate or phenolate to form the ether. The sulpho group in the specified starting material may be converted into the hydroxyl group for example by treatment with alkali. Furthermore, the aminophenanthroline employed as starting material may be converted by diazotization and hydrolysis into the hydroxy compound.

Depending upon the process employed, the new compounds are obtained as bases or in the form of their salts. From the latter, the free bases can be obtained in conventional manner. From the bases, on the other hand, it is also possible to prepare salts such, for example, as the salts of the hydrohalic acids, sulfuric acid, nitric acid, phosphoric acid, hydrocyanic acid, acetic acid, propionic acid, oxalic acid, maleic acid, citric acid, benzoic acid, methanesulfonic acid, ethanesulfonic acid, benzene-sulfonic acid, toluene-sulfonic acid, etc.

The following examples illustrate the invention, the parts and percentages being by weight unless otherwise stated and the relationship of parts by weight to parts by volume being the same as that of the kilogram to the liter. The temperatures are in degrees Centigrade.

*Example 1*

100 parts of 2-methoxy-4-nitraniline are heated with stirring for 2 hours to 140° with 400 parts by volume of water, 550 parts by volume of concentrated sulphuric acid, 260 parts by volume of glycerol and 150 parts of arsenic acid. Thereupon the temperature is maintained for 1 hour at 120° and the reaction mixture finally heated for a further hour to 140°. The whole is allowed to cool, the mixture introduced into 2000 parts by volume of ice water, the liquid suction-filtered from impurities, the filtrate adjusted to pH=6 to 7 by addition of 10 N caustic soda solution with ice cooling, the precipitate formed suction-filtered off, crystallized from 1500 parts by volume of 50 per cent. ethyl alcohol with addition of activated carbon (Norit), and in this manner the 8-methoxy-6-nitroquinoline obtained in yellow needles of melting point 149°.

30 parts of 8-methoxy-6-nitroquinoline are reduced with hydrogen at room temperature in 1000 parts by volume of ethyl alcohol with addition of 15 parts of a nickel catalyst. After the theoretical quantity of hydrogen has been taken up, the whole is suction-filtered from the catalyst and the alcohol evaporated in vacuum. For purification, the 8-methoxy-6-aminoquinoline is dissolved in 250 parts by volume of 10 per cent. hydrochloric acid and precipitated with sodium carbonate; it forms grey-white crystals having a melting point of 168°.

22 parts of 8-methoxy-6-aminoquinoline are heated with stirring for 4 hours at 140° with 75 parts by volume of water, 140 parts by volume of sulphuric acid, 75 parts by volume of glycerol and 35 parts of arsenic acid. The whole is allowed to cool, the reaction mixture introduced into 800 parts by volume of ice water, the liquid suction-filtered from impurities, and the filtrate adjusted to pH=10 with 10 N caustic soda solution with ice cooling, whereby an oil of greenish fluorescence separates, which is extracted by shaking with two quantities of 500 parts by volume each of chloroform. The chloroform extract is dried with sodium sulphate and the chloroform evaporated whereby a resinous oil remains. By distillation, there is obtained at 200-201° under 0.1 mm. pressure, as a yellow oil the 5-methoxy-4:7-phenanthroline of the formula

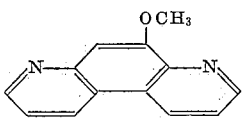

It solidifies to light yellowish crystals having a melting point of 105° and is easily soluble in water.

Example 2

60 parts of arsenic acid and 60 parts by volume of water are treated, with ice cooling, with 280 parts by volume of concentrated sulphuric acid. After introducing 20 parts of 2-methoxy-1:4-phenylene diamine, heating with stirring is carried out to 100° and within 1 hour 120 parts by volume of glycerol are added, care being taken that the temperature of the reaction mixture does not exceed 140°. After completion of the addition of glycerol, the reaction is completed by heating for 2 hours to 120° and then for 2 hours to 140°, whereupon the reaction mixture is introduced into 1000 parts by volume of ice water, treated with 20 parts of activated carbon (Norit) and allowed to stand for 12 hours. The liquid is then suction filtered from the activated carbon and impurities, adjusted with 10 N caustic soda solution to pH=10 and extracted with chloroform. The residue on evaporation of the chloroform distils at 200-201° under 0.1 mm. pressure and solidifies in the receiver to yellow crystals, the mixed melting point of which with the 5-methoxy-4:7-phenanthroline obtained according to Example 1 exhibits no depression.

Example 3

10 parts of 5-chloro-4:7-phenanthroline (melting point 140°; obtained from 2-chloro-1:4-phenylene diamine by the Skraup method) are heated for 6 hours in a closed tube to 180° with 50 parts by volume of methyl alcohol, 5 parts of caustic potash and 1 part of copper bronze. Thereupon the methyl alcohol is distilled off, the residue extracted with 200 parts by volume of 2 N hydrochloric acid, the liquid rendered alkaline with caustic soda solution and extracted with chloroform, and by distillation of the residue after evaporation of the chloroform the 5-methoxy-4:7-phenanthroline, which is described in Example 1 and 2, obtained.

5 parts of 5-methoxy-4:7-phenanthroline are dissolved in 23.8 parts by volume of N hydrochloric acid, and the red-colored solution evaporated to dryness in a vacuum. The residue is crystallized from a small quantity of boiling methanol and the mono-hydrochloride of 5-methoxy-4:7-phenanthroline thus obtained as hygroscopic white crystals which melt at 245° (with decomposition).

3.7 parts of 5-methoxy - 4:7 - phenanthroline are dissolved in 50 parts by volume of ethyl acetate and 35 parts by volume of a 2 N solution of methanesulfonic acid in ethyl acetate added thereto. After decanting the solvent, the separated red oily mass is crystallized from ethyl alcohol, and the di-methanesulfonate of 5-methoxy-4:7-phenanthroline is thus obtained as hygroscopic yellow crystals which melt at 191°.

In analogous manner there can be prepared salts of the other acids such as of other hydrohalic acids, sulfuric acid, nitric acid, phosphoric acid, hydrocyanic acid, acetic acid, benzoic acid, ethane sulfonic acid, hydroxy ethane sulfonic acid, benzene sulfonic acid, or toluene sulfonic acid. It may be noted that similar salts of the other bases disclosed in this specification may be prepared in like manner.

Example 4

7.5 parts of 5-methoxy - 4 : 7-phenanthroline are heated for 12 hours to 140° with 50 parts by volume of saturated aqueous hydrobromic acid solution. The cooled reaction mixture is adjusted with saturated sodium carbonate solution to pH=6 and the precipitate formed suction-filtered off and crystallized from benzene and, in this manner, the 5-hydroxy-4:7-phenanthroline of the formula:

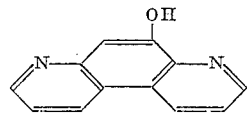

obtained in the form of white crystals of melting point 149°.

Example 5

A solution of 3 parts of 5-hydroxyl-4:7-phenanthroline, 0.7 part of solid sodium hydroxide and 2.5 parts of ethyl bromide in 200 parts by volume of ethyl alcohol is heated to boiling for 2 hours. Then the solvent is distilled off under vacuum, 100 parts by volume of 2 N caustic soda solution are added to the residue, and then extraction is effected with 500 parts by volume of chloroform. After evaporation of the chloroform, dried with sodium sulfate, recrystallization is carried out from petroleum ether or ethyl acetate, whereupon 5-ethoxy-4:7-phenanthroline:

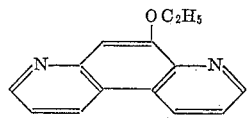

is obtained as white crystals having a melting point of 123°.

Example 6

4.5 parts of guaiacol are heated to 120° for 1 hour with 2 parts of solid potassium hydroxide and then to 180° for 10 hours with 5.7 parts of 5-chloro-4:7-phenanthroline and 0.5 part of copper bronze. 300 parts by volume of 2 N hydrochloric acid are added to the reaction mixture, impurities separated by suction-filtration, and extraction carried out two times with 100 parts by volume of ether in order to remove excess guaiacol. The acid solution is adjusted to pH=10 with 2 N caustic soda solution and extracted with 500 parts by volume of chloroform. After evaporating off the chloroform, dried with sodium sulfate, the residue is crystallized from benzene, whereupon 5-(o-methoxy-phenoxy)-4:7-phenanthroline of the formula:

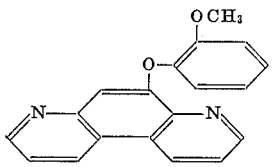

is obtained; it melts at 206°.

*Example 7*

50 parts of arsenic acid, 40 parts by volume of water, 100 parts by volume of concentrated sulfuric acid, 80 parts of glycerine, and 18 parts of 2:5-diaminophenol chlorhydrate are heated to 120° C. for 1 hour and then to 130° C. for about an hour and a half; when the reaction sets in heat is cut off and the whole is allowed to cool, whereupon the reaction mixture is then introduced into 500 parts by volume of ice water, and impurities removed by suction-filtering. The pH is adjusted to 7 with 10 N-caustic soda solution with cooling. Extraction is carried out two times with 1000 parts by volume of benzene, and the solvent dried with sodium sulfate, and evaporated. The resultant brown solid residue is recrystallized from a small quantity of boiling benzene with addition of activated carbon. The mixed melting point with the 5-hydroxy-4:7-phenanthroline obtained according to Example 4 exhibits no depression.

Having thus disclosed the invention, what is claimed is:

1. A member selected from the group consisting of 5-hydroxy-4:7-phenonthroline, 4:7-phenanthroline having in 5-position a lower alkoxy group, 4:7-phenanthroline having in 5-position a phenoxy group, and the acid salts of the said compounds.

2. 5-hydroxy-4:7-phenanthroline.

3. 5-methoxy-4:7-phenanthroline.

JEAN DRUEY.
PAUL SCHMIDT.

References Cited in the file of this patent

UNITED STATES PATENTS

| Number | Name | Date |
|---|---|---|
| 2,163,946 | Henecka | June 27, 1939 |

OTHER REFERENCES

Halcrow et al.: J. Chem. Soc. (London), 1946, pp. 155–157.

Albert et al.: Brit. J. Exp't'l. Path., vol. 28, page 78 (1947).

Karrer et al.: Helv. Chim. Acta, vol. 31, pp. 786–794 (1948).

Meyer: "Synthese der Kohlenstoffverbindungen," part 2, Heterocyclics (second half) (Edwards Bros.; Ann Arbor, Mich. 1940), pp. 972, 973, 977 and 978.